No. 704,695. Patented July 15, 1902.
J. L. CREVELING.
COMBINED ELECTRIC AND GAS CAR LIGHTING SYSTEM.
(Application filed Jan. 18, 1902.)
(No Model.)
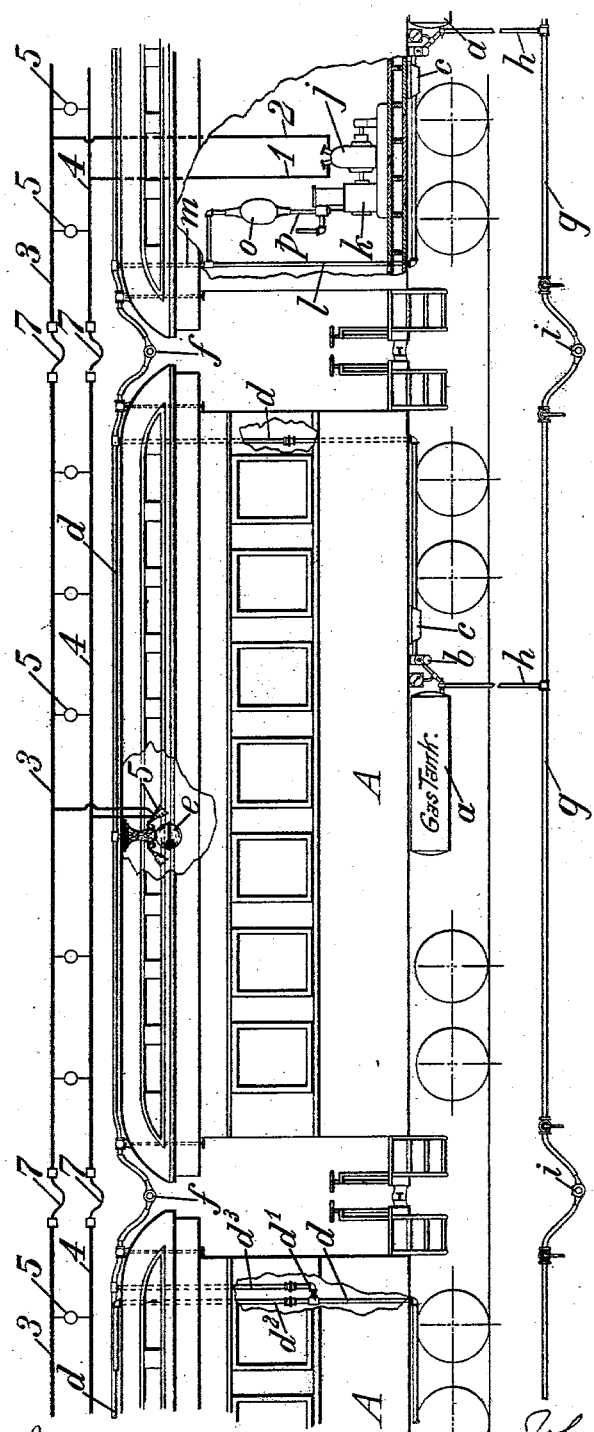
WITNESSES:
E. J. Schroeder, Jr.
Conrad Krempf
INVENTOR
John L. Creveling
BY
Kenneson Cram &c.
ATTORNEYS

UNITED STATES PATENT OFFICE.

JOHN L. CREVELING, OF NEW YORK, N. Y., ASSIGNOR TO SAFETY CAR HEATING & LIGHTING COMPANY, A CORPORATION OF NEW JERSEY.

COMBINED ELECTRIC AND GAS CAR-LIGHTING SYSTEM.

SPECIFICATION forming part of Letters Patent No. 704,695, dated July 15, 1902.

Application filed January 18, 1902. Serial No. 90,332. (No model.)

*To all whom it may concern:*

Be it known that I, JOHN L. CREVELING, a citizen of the United States, and a resident of the borough of Manhattan, city, county, and State of New York, have invented certain new and useful Improvements in a Combined Electric and Gas Car-Lighting System, of which the following is a specification.

My invention relates to combined electric and gas car-lighting systems.

The invention will be described with particular reference to the well-known Pintsch lighting system, it being understood, however, that such description and illustration are for purposes of illustration merely and that I regard as within the scope of my invention any equivalent construction which within the limits of the state of the art may be included therein.

In the accompanying drawing I have shown one form of system in which my invention is embodied.

Before proceeding to describe the construction in detail I will state that in a general way the drawing shows a series of cars provided with the Pintsch lighting system and wired for electric lights and provided with couplings between the various cars for both gas and electric systems when the cars are made up into a train. It will of course be understood that the couplers used for connecting the gas systems of the various cars are preferably of the type having a valve which opens when the two couplers are properly united together and which closes, thus preventing the escape of gas, when the couplers are separated, or other analogous type may be used. This type of coupler is not shown in detail, inasmuch as it is well known in the art, having been used in the old style "straight air-brake system."

The current for the train is to be supplied by a generator placed in the baggage or other car and driven by a gas-engine taking gas from the various gas systems upon the several cars of the train. In the drawing I have shown the cars provided with high and low gas-pressure systems connected between adjacent cars, so that either gas system may be used for supplying the gas-engine, as sometimes one system may be used to advantage and sometimes another. Inasmuch as but one system may be used at a time, it is not necessary to connect both systems.

In the drawing, A represents the cars of the train, each of which cars is shown as provided with the Pintsch gas system, which is illustrated in the present instance as a tank $a$, provided with suitable pipe connections, filling-valves $b$, a regulator $c$, and low-pressure pipe system $d$, connected to one or more gas-lamps $e$, shown herein as an inverted-piano-stool lamp. The pipes $d$ and other connections beyond the regulators constitute the low-pressure system of the car or train.

In the car of the left-hand side of the figure I have shown the pipe leading from the reservoir as divided at the point $d'$, one branch $d^2$ communicating with the lamps of the car and the other branch $d^3$ forming a portion of the supply-piping to the gas-engine.

The low-pressure side of the system is connected by couplers $f$, which, as before stated, are preferably of a self-closing character. On the high-pressure side I have shown a train-pipe $g$ in each car connected by a pipe $h$ with the reservoirs $a$. Suitable couplings $i$, preferably of the character above mentioned, serve to connect several pipes $g$ of the various cars.

In one of the cars—let us say the baggage-car—I install a suitable dynamo $j$, driven by a suitable gas-engine $k$, directly coupled thereto, or otherwise. Both the high and low pressure gas systems of the train are shown as connected, by means of pipes $l$ and $m$, to a suitable expansible reservoir $o$, connected by pipe $p$ with the supply-port of the gas-engine, the high-pressure side being connected through the regulator $c$ of the baggage-car. Mains 1 and 2 lead from the generator and are shown as connected in multiple to the mains 3 4, being connected, preferably, by flexible detachable couplings 7. It is believed that the operation of the construction will be fully understood.

When the train is made up, the couplings are suitably connected and each car can contribute a portion of the gas to the gas-engine $k$. The gas-engine being set in motion, the dynamo will feed current to the mains and the cars will be electrically lighted by the current generated at the expense of the gas-supply carried by all the cars, and in case the cars become detached or are intentionally detached each car will have an independent gas-lighting system when detached from the train; but when secured together to constitute a train each car forms a unit of a multiple lighting system, each unit supplying a portion of the gas to the engine.

Having described in detail one form of apparatus in which my invention is embodied and without limiting myself thereto, what I claim, and desire to secure by Letters Patent, is—

1. A train-lighting system, comprising detachable cars, a gas-supply carried by the respective cars, a gas-lighting system in connection therewith, an electric system of distribution carried by the respective cars, and a gas-engine and dynamo, the dynamo being in electrical communication with the systems of distribution of the respective cars and the gas-engine being in communication with the gas system of the respective cars.

2. A train system, comprising a series of cars carrying gas and electric lighting systems, and gas-storage reservoirs carried by the respective cars, the gas systems of the respective cars being in communication with each other through automatically-closing couplers, a gas-engine and dynamo, the dynamo being in electrical communication with the respective electric-lighting systems of the cars and the gas-engine being in communication with the gas systems of the respective cars.

3. A train-lighting system comprising in detachable cars, a series of gas-lighting systems, detachable one from the other and carried by the respective cars, electric-lighting systems for the respective cars, and a dynamo, driven from the gas system and supplying current to the electric system.

4. In a car-lighting system, the combination of a series of cars, gas-lighting systems carried by the respective cars, an electrical system of distribution carried by the respective cars, a dynamo, and a gas-engine fed by train-pipes in communication with the gas systems of the respective cars.

5. A series of train-lighting units, each comprising a mutually independent gas and electric lighting system, and a gas-engine and dynamo forming a connection between the gas lighting and electric-lighting systems whereby the same are rendered interdependent.

6. A train-lighting system, comprising a series of units in detachable connection with each other, each unit being provided with a gas-lighting system and a system of electrical distribution, mutually independent of each other, a generator for the systems of electrical distribution and a gas-motor for driving the generator, fed from gas-lighting systems of the respective units.

JOHN L. CREVELING.

Witnesses:
LOUIS E. SALMON,
GEO. E. MORSE.